(12) United States Patent
Yablon

(10) Patent No.: US 10,724,197 B1
(45) Date of Patent: Jul. 28, 2020

(54) HEIGHT ADJUSTING DOCKING APPARATUS

(71) Applicant: Rand Yablon, Pottstown, PA (US)

(72) Inventor: Rand Yablon, Pottstown, PA (US)

(*) Notice: Subject to any disclaimer, the term of this patent is extended or adjusted under 35 U.S.C. 154(b) by 0 days.

(21) Appl. No.: 16/356,784

(22) Filed: Mar. 18, 2019

(51) Int. Cl.
*E02B 3/26* (2006.01)
*E02B 3/24* (2006.01)

(52) U.S. Cl.
CPC . *E02B 3/24* (2013.01); *E02B 3/26* (2013.01)

(58) Field of Classification Search
CPC .......................................... E02B 3/26
USPC ................ 114/219, 220, 230.17; 14/76; 405/211–216
See application file for complete search history.

(56) References Cited

U.S. PATENT DOCUMENTS

| 3,528,383 A | 9/1970 | Fetters |
| 3,771,778 A * | 11/1973 | Muller .................... B60R 19/20 267/140 |
| 3,842,779 A | 10/1974 | Jaynes |
| 4,357,891 A | 11/1982 | Sluys |
| 5,301,628 A | 4/1994 | Daskalides |
| 5,762,016 A * | 6/1998 | Parsons ..................... E02B 3/24 114/219 |
| 2014/0366793 A1* | 12/2014 | Mahlich .................. B63B 21/04 114/230.2 |

FOREIGN PATENT DOCUMENTS

JP        61-294012 A  * 12/1986

OTHER PUBLICATIONS

Machine Translation, JP 61-294012, 4 pages (Year: 1986).*

* cited by examiner

*Primary Examiner* — Sunil Singh
(74) *Attorney, Agent, or Firm* — Axenfeld Law Group, LLC; Robert R. Axenfeld, Esq.

(57) ABSTRACT

Described is an apparatus for securing a boat to a dock or other marine structure that moves with the boat as the boat is raised and lowered by waves or the tide. The apparatus is secured to a dock or other marine structure and includes a track, preferably in a shape similar to that of an "I" beam, a carriage that moves along the track, and a bumper that is attached to a front portion of the carriage. The boat is secured to either a mooring line or mooring cleat on the carriage. As the boat is raised or lowered by waves or the tide, the carriage is also raised or lowered along the track accordingly. The bumper is secured to the outside of the carriage and prevents the boat from being damaged if the boat collides with the bumper.

9 Claims, 6 Drawing Sheets

HEIGHT ADJUSTING DOCKING APPARATUS

BACKGROUND

Boats are generally moored to a dock using a mooring device such as a mooring line and cleat. While moored, a boat still moves with changes to the level of the surface of the water. This motion is especially pronounced when a boat is hit by a sizable wave or when a boat is moored for a long enough period that it feels the effects of the changing tide.

In order to compensate for these changes in the water's surface, boat owners leave some slack in their mooring lines. This slack, however, allows the boat to pitch and yaw which can result in the boat colliding with the dock, nearby boats, or other nearby items. This can cause damage to the boat, the dock, or nearby items. To diminish the likelihood of such damage, some boats and docks use foam or rubber bumpers. These bumpers, however, are generally stationary, meaning that they do not adjust to the height of the surface of the water relative to the boat. Such stationary bumpers cannot prevent damage associated with significant changes in water level.

SUMMARY

Described is an apparatus for securing a boat to a dock or other marine structure that addresses many of the deficiencies discussed above.

In one embodiment, the apparatus includes a track, preferably in a shape similar to that of an 'I' beam, a carriage that moves along the track, and a bumper that is attached to a front portion of the carriage.

In order to secure a boat to the apparatus, the carriage includes either a mooring line and/or a mooring cleat. An individual operating the apparatus can either tie the mooring line on the carriage to a mooring cleat on the boat or tie a mooring line from the boat to a mooring cleat on the carriage. In one embodiment, the mooring line on the carriage contains Kevlar, so as to increase the tensile strength of the mooring line.

The rear surface of the track attaches to a dock or other marine structure in such a manner as to allow the carriage to move along the track in a vertical motion. When a boat is secured to the carriage, the carriage will move up and down the track as the boat is raised or lowered by waves or the tide.

The carriage has an inner surface and outer surface that together form a 'U' shape. There are two articulating members attached to the inner surface of the carriage. The first articulating member is located at a distal end of the carriage, while the second articulating member is located at the opposing distal end of the carriage. Each articulating member pivots around a point located at the center of each member. The carriage moves along the track on the set of articulating members. The pivot points allow each member to pivot in a direction perpendicular to the track. As the carriage moves along the track using the members, the members will pivot to conform to imperfections or bends in the track. This means that small bends or imperfections in the track will not prevent the carriage from moving along the track.

The apparatus includes a bumper secured to the outer surface of the carriage. This bumper is made of a buoyant material, so that the carriage and bumper will float on surface of the water if the carriage is unsecured from the boat. The bumper is also made of a shock-absorbent material, so that if the boat collides with the bumper, the boat will be unharmed. In one embodiment, the bumper is removably attached to the carriage in order to allow for quick replacement of the bumper.

In one embodiment, the apparatus includes a locking mechanism to prevent the carriage from moving when not secured to a boat. For example, the track can include a small hole in which an individual using the apparatus can place a pin. This pin would prevent the carriage from falling below the hole, thereby locking the carriage in place.

In another embodiment, the track and the carriage are primarily composed of aluminum or some other strong, non-corroding material. The apparatus is used near water. Using a non-corroding material prevents the apparatus from rusting or corroding when inevitably exposed to water.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment," "an embodiment," "an aspect," "an implementation," "an example," or similar formulations, means that a particular feature, structure, operation, or characteristic described in connection with the embodiment is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description is described with reference to the accompanying figures. In the figures, the left-most digit(s) of a reference number identifies the figure in which the reference number first appears. The figures are not necessarily drawn to scale.

DETAILED DESCRIPTION

Described is an apparatus for securing a boat to a dock or other marine structure that, in part, moves with the boat as the boat is raised or lowered by the motion of the water.

Some embodiments of the apparatus may be described with reference to FIGS. 1 through 6.

Figure 1:
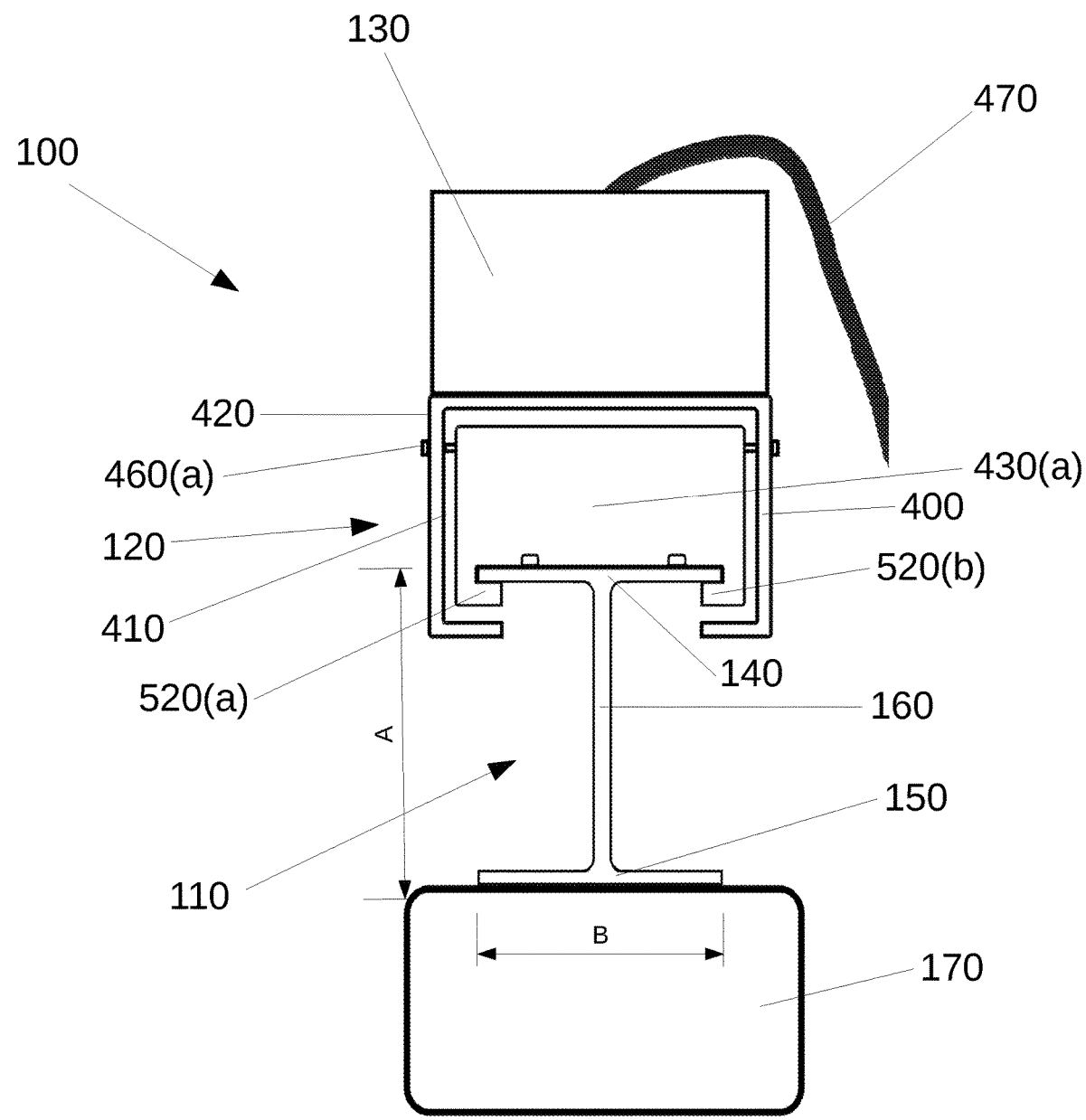
FIG. 1 shows a top view of an embodiment of a boat docking apparatus.

FIG. 1 shows a top view of an embodiment of the apparatus 100. Apparatus 100 may include a track 110, a carriage 120, and a bumper 130.

Track

As shown in FIG. 1, track 110 includes a front portion 140 and a rear portion 150 that are connected by a middle portion 160. Preferably, these three portions form a shape similar to that of an "I" beam. In one embodiment, an "I" beam is used for track 110.

Middle portion 160 has a length equal to a distance 'A'. This is also the distance between front portion 140 and rear portion 150. In one embodiment, this distance is approximately four to six inches. Rear portion 150 has a width equal to a distance 'B'. In one embodiment, this distance is approximately three to five inches. Front portion 140 generally has the same width as rear portion 150, but in some embodiments they can differ.

Rear portion 150 secures to a boat dock pole 170 or some other marine structure (not shown). Carriage 120 movably attaches to front portion 140.

Figure 2:
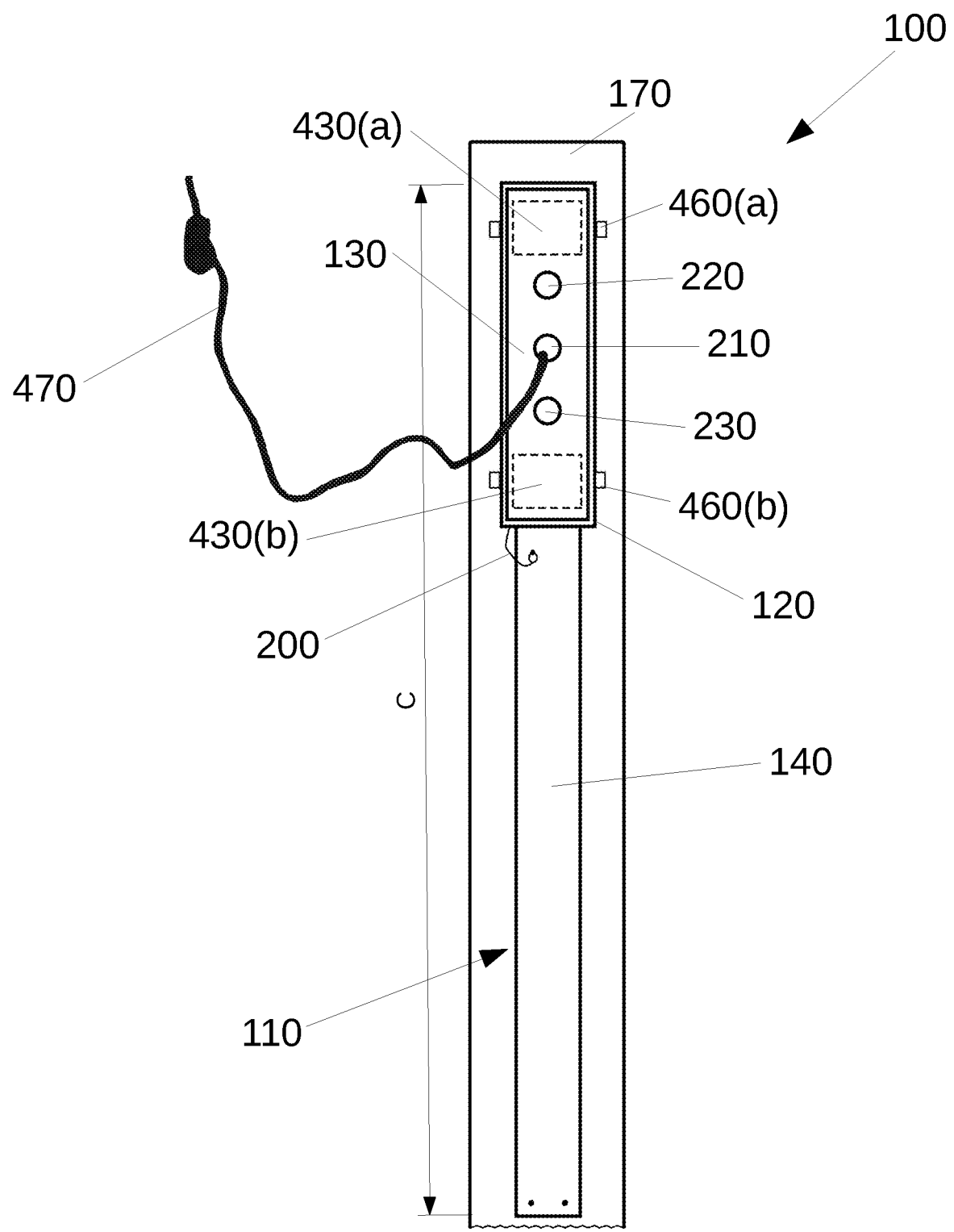
FIG. 2 shows a front view of an embodiment of a boat docking apparatus.

As shown in FIG. 2, track 110 has a length equal to a distance 'C'. In one embodiment, this distance is approximately eight to ten feet. Track 110 is configured to allow carriage 120 to move along almost the entire length of track 110.

Figure 3:
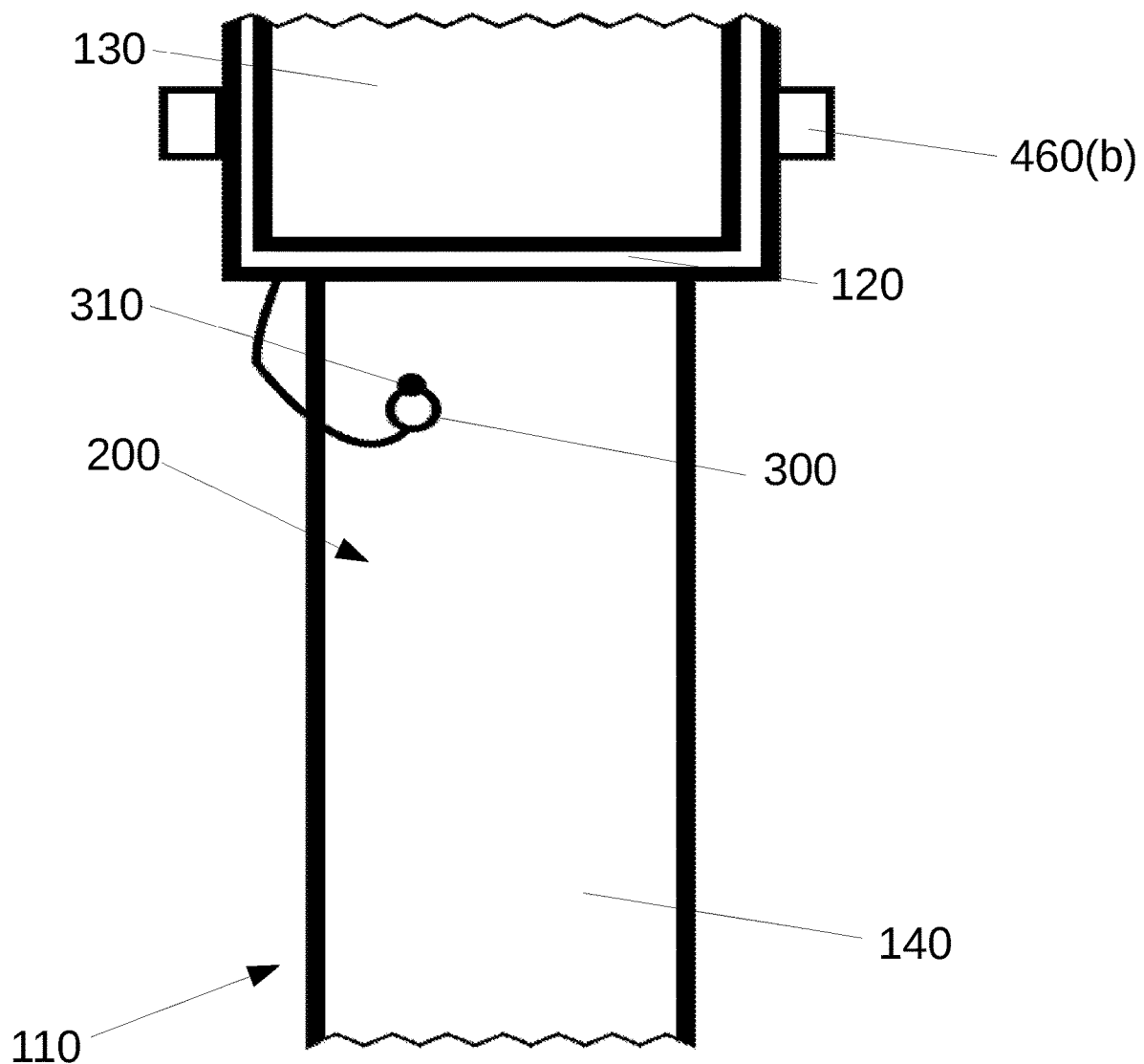
FIG. 3 shows a front view of a portion of an embodiment of a boat docking apparatus.

In one embodiment, track 110 includes a locking mechanism 200. When engaged, locking mechanism 200 prevents carriage 120 from moving past locking mechanism 200 when carriage 120 is moving along track 110. Given the benefit of this disclosure, one skilled in the art would recognize that locking mechanism 200 can take several forms including but not limited to a clamp or a pin and socket. FIG. 3 shows a more detailed view of an embodiment of locking mechanism 200 using a pin 300 and a socket 310.

Given the benefit of this disclosure, one skilled in the art would recognize that track 110 can be composed of any resilient, non-corroding material such as aluminum.

Carriage

Figure 4:
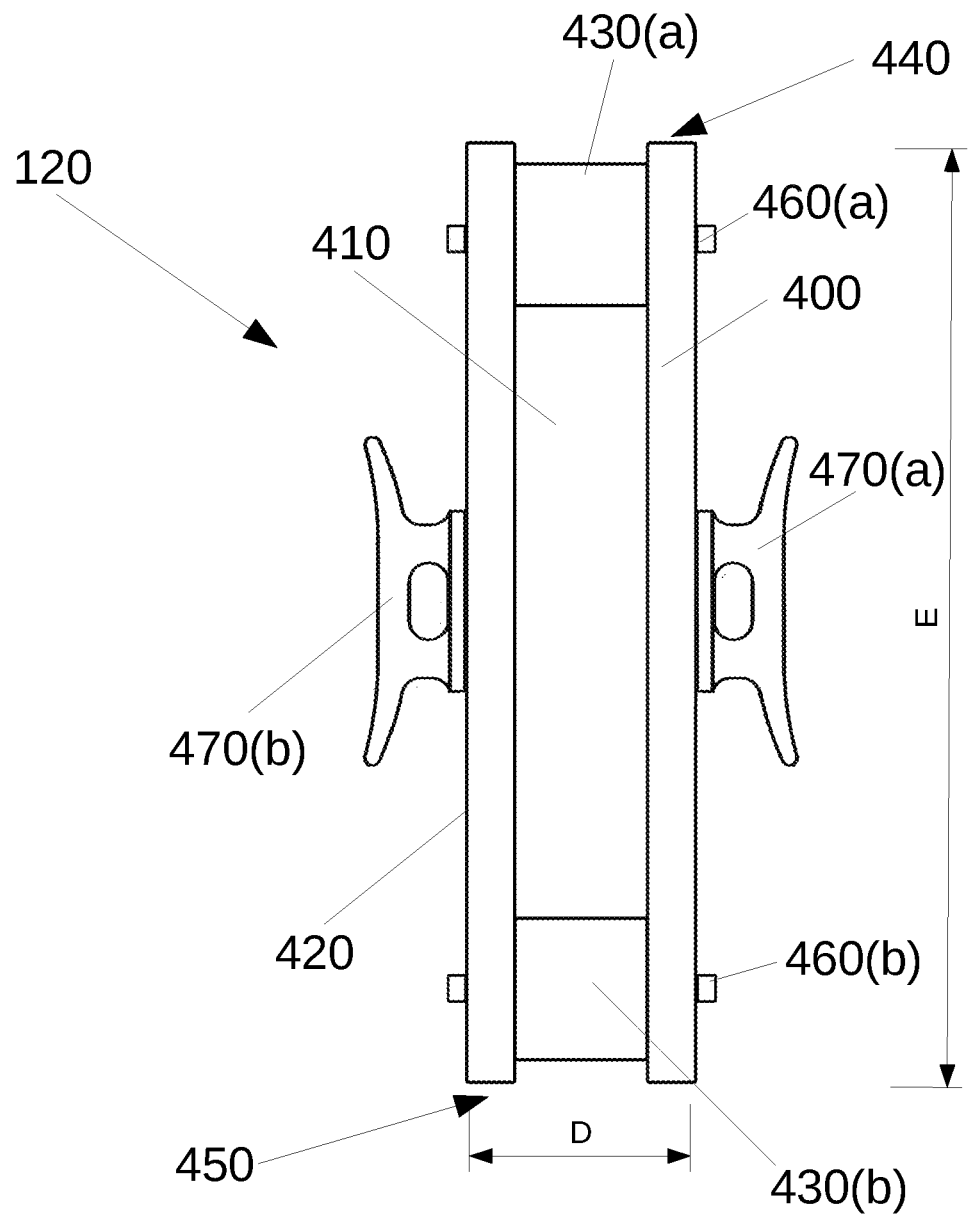
FIG. 4 shows a rear view of a carriage from an embodiment of a boat docking apparatus.

As shown in FIG. 4, carriage 120 includes a shell 400 an inner surface 410, an outer surface 420, a first articulating member 430(*a*), and a second articulating member 430(*b*). Carriage 120 also includes a securing mechanism 470 which takes the form of a first mooring cleat 470(*a*) and a second mooring cleat 470(*b*), in the embodiment shown in FIG. 4.

Carriage 120 has a width equal to a distance 'D'. In one embodiment, this distance is approximately four to six inches. Carriage 120 has a length equal to a distance 'E'. In one embodiment, this distance is approximately sixteen to twenty-four inches.

Shell 400 forms a 'U' shape. Member 430(*a*) and member 430(*b*) secure to carriage 120 on the inner portion of that 'U' shape.

Member 430(*a*) secures to carriage 120 at a distal end 440 of carriage 120. Member 430(*b*) secures to carriage 120 at the opposing distal end 450. Member 430(*a*) connects to inner surface 410 by rod 460(*a*). Rod 460(*a*) passes through one side of carriage 120 through outer surface 420, inner surface 410, member 430(*a*), and then again through inner surface 410 and outer surface 420 on the opposing side of carriage 120. Member 430(*a*) connects to rod 460(*a*). Member 430(*b*) connects to inner surface 410 by rod 460(*b*). Rod 460(*b*) passes through one side of carriage 120 through outer surface 420, inner surface 410, member 430(*b*), and then again through inner surface 410 and outer surface 420 on the opposing side of carriage 120.

Figure 5:
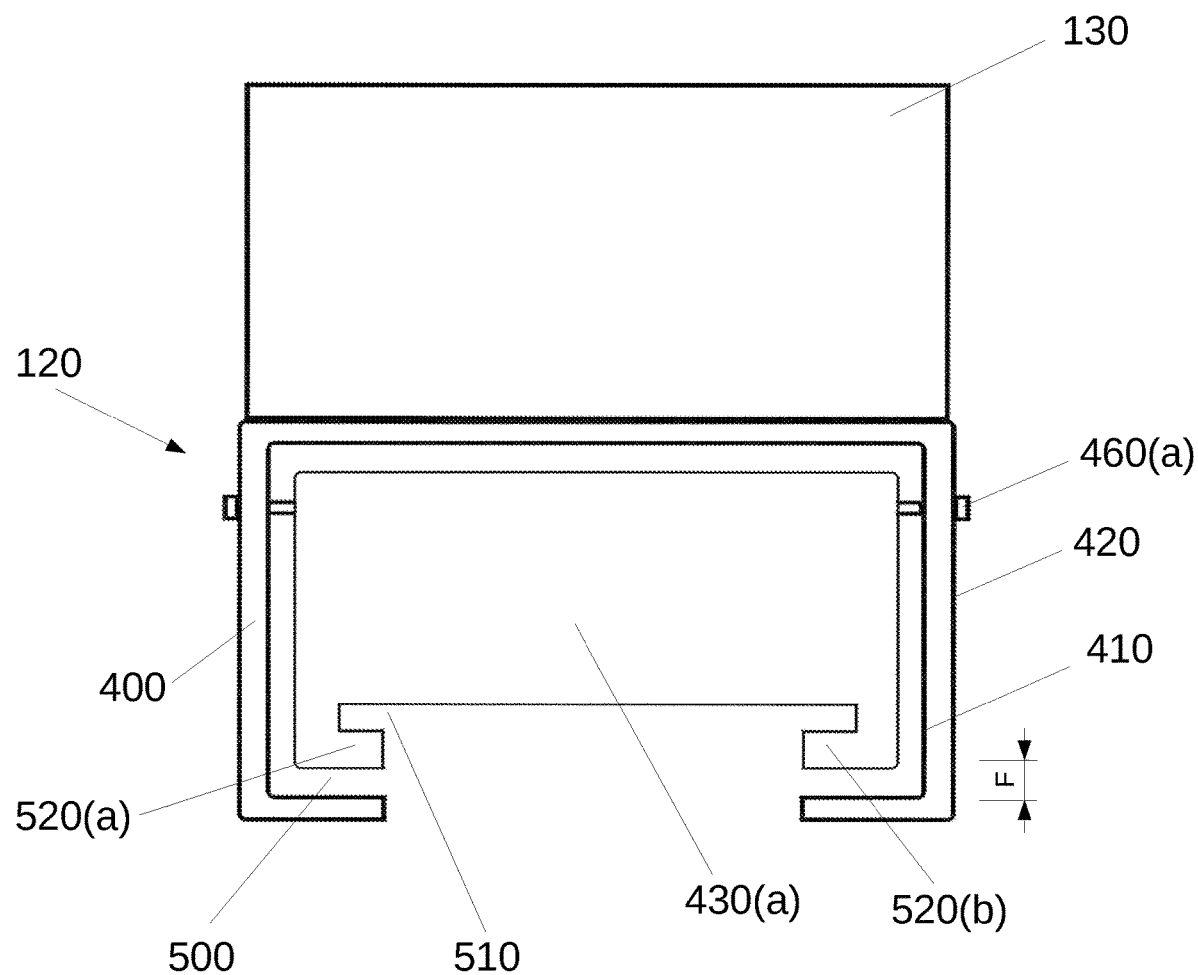
FIG. 5 shows a top view of a carriage and bumper from an embodiment of a boat docking apparatus.

As shown in FIG. 5, member 430(*a*) connects to inner surface 410 such that there is a gap 500 between member 430(*a*) and inner surface 410. The distance between member 430(*a*) and inner surface 410, namely gap 500, is approximately equal to a distance 'F'. Such a distance is approximately equal to a quarter-inch to a half-inch. Member 430(*a*) also includes channel 510 and notches 520(*a*) and 520(*b*).

Returning to the embodiment shown in FIG. 1, channel 510 takes a form that approximately conforms to outer portion 140 with notches 520(*a*) and 520(*b*) extending along the rear side of outer portion 140. With the benefit of this disclosure, one skilled in the art would recognize that notches 520(*a*) and 520(*b*) can vary in length with a maximum length extending to reach middle portion 160. Member 430(*b*) takes a form similar to that of member 430(*a*), in that member 430(*b*) also includes a channel that approximately conforms to outer portion 140 and notches that extending along the rear side of outer portion 140. This configuration for members 430(*a*) and 430(*b*) movably attaches carriage 120 to track 110.

Also, as shown in FIG. 1, securing mechanism 470 takes the form of a mooring line. Such a mooring line can contain Kevlar, Dyneema or any similar material to increase the mooring line's tensile strength.

Given the benefit of this disclosure, one skilled in the art would recognize that member 430(*a*) and member 430(*b*) are composed of a resilient material that easily slides along track 110 such as polytetrafluoroethylene. Also, one skilled in the art would recognize that inner surface 410 and outer surface 420 can be composed of any resilient, non-corroding material such as aluminum.

Bumper

Continuing with FIG. 1, apparatus 100 includes bumper 130. Bumper 130 secures to outer surface 420. Bumper 130 has approximately the same dimensions as carriage 120.

Returning to FIG. 2, bumper 130 includes at least one hole 210. In the embodiment shown in FIG. 2, bumper 130 also includes a second hole 220 and a third hole 230. When securing mechanism 470 takes the form of a mooring rope, securing mechanism 470 can extend through one of holes 210, 220, or 230.

In another embodiment, bumper 130 is composed of a buoyant material, so that carriage 120 and bumper 130 can float on surface of the water. Bumper 130 is also made of a shock-absorbent material, so that if a boat collides with bumper 130, the boat will be unharmed.

In yet another embodiment, bumper 130 removably attaches to outer surface 420. Given the benefit of this disclosure, one skilled in the art would recognize that bumper 130 can be removably attached to outer surface 420 using various mechanisms including using a hook-and-loop system.

Operation

Apparatus 100 allows a boat owner to moor a boat to a dock or other marine structure in a manner that does not change the tension in the mooring lines used by the boat owner when the level of the surface of the water changes.

Before using apparatus 100, a boat owner must have secured rear portion 150 to a dock or other marine structure such that track 110 is vertically aligned. When a boat owner uses apparatus 100 to moor a boat to a dock or other marine structure, the boat owner will secure the boat to carriage 120 with securing mechanism 470. If securing mechanism 470 takes the form of a mooring line, then the boat owner will tie securing mechanism 470 to a mooring cleat on the boat.

If securing mechanism 470 takes the form of a mooring cleat, then the boat owner will tie a mooring line from the boat to securing mechanism 470. The boat owner should only leave a small amount of slack in the mooring line.

With the boat secured to carriage 120, carriage 120 will move along track 110 as the boat rises or falls with the motion of the water, for instance high-tide or low-tide. For example, as the tide raises the level of the water and, therefore, the boat, carriage 120 will rise along track 110 in concert with the boat. Because carriage 120 moves in concert with the boat, the tension in the mooring line will not change drastically as the boat moves. The nearly constant tension in the line reduces the amount that the boat will pitch and yaw. This reduction in the motion of the boat, in turn, will reduce the damage to the boat, the dock, and other nearby items.

To further reduce damage, bumper 130 secures to outer surface 420 of carriage 210. Bumper 130 is composed of a shock-absorbent material, which means that when the boat collides with bumper 130, the boat will not be damaged. Because bumper 130 is secured to carriage 120, bumper 130 will move with carriage 120. This means that when the boat is raised or lowered by the water, bumper 130 will move accordingly. As a result, bumper 130 will maintain a position between the boat and the dock, which will prevent damage to both.

In one embodiment, bumper 130 is composed of a buoyant material. In the event that carriage 120 becomes unsecured from the boat, bumper 130 will allow carriage 120 to float on the surface of the water. This means that a boat owner will not have to search for carriage 120 under the surface of the water.

In another embodiment, bumper 130 is removably attached to carriage 120. As a result of repeated collisions with a boat, over time, bumper 130 may degrade. When removably attached, bumper 130 would be easy for a boat owner to replace with another undamaged bumper.

Returning to the operation of apparatus 100 when secured to a boat, carriage 120 moves along track 110 on a set of articulating members 430(a) and 430(b). Members 430(a) and 430(b) movably attach to carriage 120 at Rods 460(a) and 460(b) accordingly. Rods 460(a) and 460(b) allow members 430(a) and 430(b) to pivot in a direction perpendicular to track 110. As carriage 120 moves along track 110 using members 430(a) and 430(b), members 430(a) and 430(b) will pivot to conform to imperfections or bends in the track. This means that small bends or imperfections in track 110 will not prevent carriage 120 from moving along track 110.

Figures 6A, 6B:
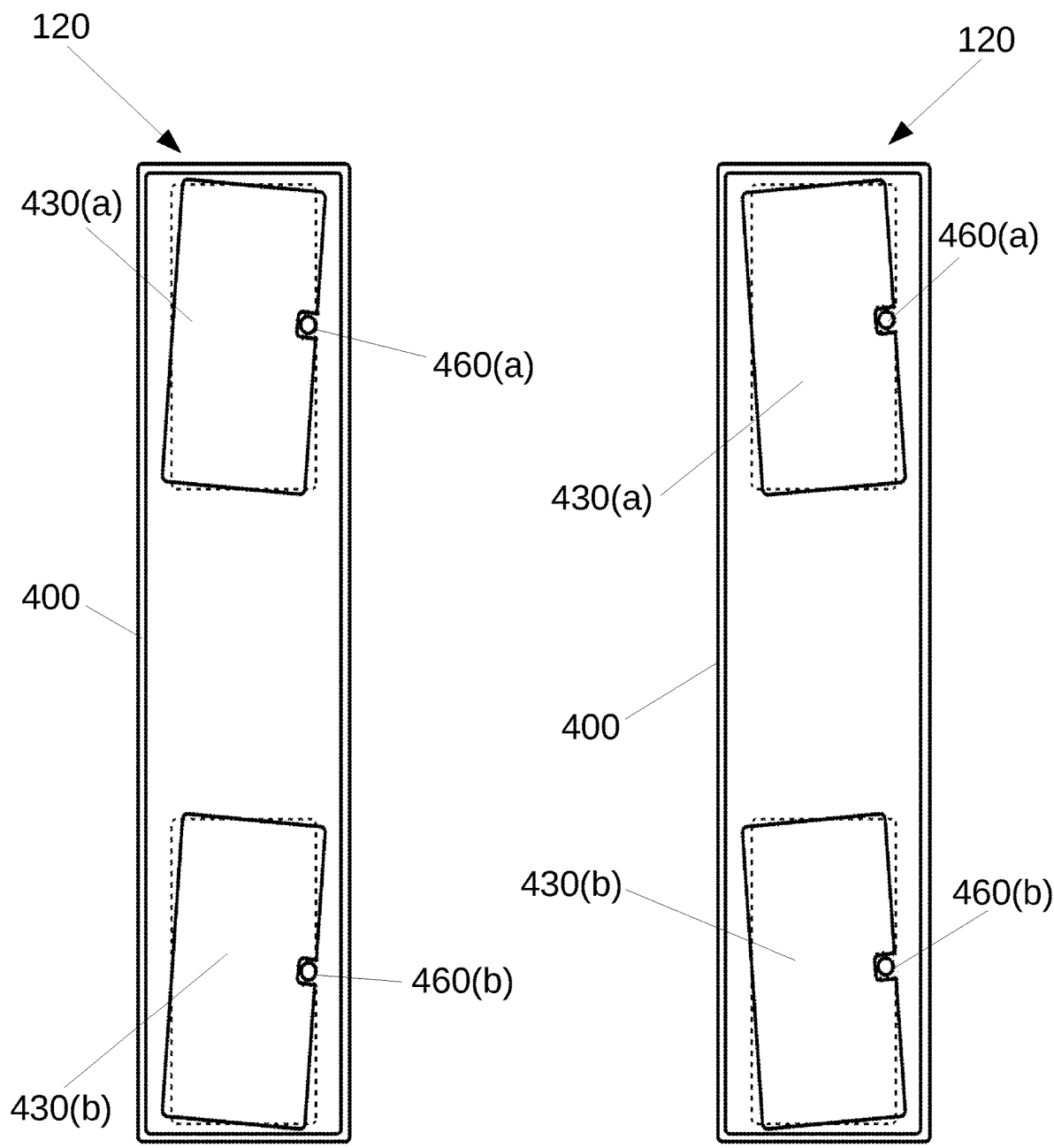
FIG. 6A and FIG. 6B show a cut-away drawing of a side view of a carriage demonstrating the pivoting motion of both articulating members from an embodiment of a boat docking apparatus.

For example, if there is a bump in track 110, then members 430(a) and 430(b) will pivot in a direction perpendicular to track 110 in order to conform to the shape of the bump. This type of motion is shown in FIGS. 6A and 6B.

In another embodiment, apparatus 110 includes locking mechanism 200. When engaged by a boat owner, locking mechanism 200 will prevent carriage 120 from moving along track 110. This is especially useful when carriage 120 is not secured to a boat, because locking mechanism 200 will keep carriage 120 in a position that is easily accessible to a boat owner.

In yet another embodiment, track 110 and carriage 120 are primarily composed of aluminum or some other resilient, non-corroding material. Apparatus 100 is generally positioned near water. Using a non-corroding material prevents apparatus 100 from rusting or corroding when inevitably exposed to that water. In addition, members 430(a) and 430(b) are primarily composed of polytetrafluoroethylene or some other resilient material that easily slides along track 110. Using a material that easily slides along track 110 allows apparatus 100 to operate without the aid of any sort of lubricant.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. An apparatus for securing a boat, comprising:
   a track configured for secure attachment, in a vertical manner, to a marine structure; and
   a carriage with a shell, an inner section, a first rod, a second rod, a first articulating member and a second articulating member;
   wherein the shell forms a 'U' shape around the inner section, the first rod is secured to the shell within the inner section proximal to a distal end of the carriage, the second rod is secured to the shell within the inner section proximal to an opposing distal end of the carriage, the first articulating member is movably attached to the first rod such that the first articulating member pivots around the first rod, the second articulating member is movably attached to the second rod such that the second articulating member pivots around the second rod, and the first articulating member and second articulating member are movably attached to the track such that the first articulating member and second articulating member slide along the track in a vertical manner,
   wherein a bumper composed of a buoyant material is removably attached to the shell of the carriage.

2. The apparatus of claim 1, wherein the track is composed at least partially of aluminum.

3. The apparatus of claim 1, wherein the track is an 'I' beam.

4. The apparatus of claim 1, wherein the track further includes a locking mechanism configured to prevent the carriage from moving along the track.

5. The apparatus of claim 1, wherein the carriage is composed at least partially of aluminum.

6. An apparatus for securing a boat, comprising:
   a track configured for secure attachment, in a vertical manner, to a marine structure; and
   a carriage with a shell, an inner section, a first rod, a second rod, a first articulating member and a second articulating member, wherein the carriage further includes a mooring cleat configured such that a mooring line can be secured to the cleat;
   wherein the shell forms a 'U' shape around the inner section, the first rod is secured to the shell within the inner section proximal to a distal end of the carriage, the second rod is secured to the shell within the inner section proximal to an opposing distal end of the carriage, the first articulating member is movably attached to the first rod such that the first articulating member pivots around the first rod, the second articulating member is movably attached to the second rod such that the second articulating member pivots around the second rod, and the first articulating member and second articulating member are movably attached to the track such that the first articulating member and second articulating member slide along the track in a vertical manner.

7. An apparatus for securing a boat, comprising:
   a track configured for secure attachment, in a vertical manner, to a marine structure; and a carriage with a shell, an inner section, a first rod, a second rod, a first articulating member and a second articulating member, wherein the carriage further includes a mooring line;

wherein the shell forms a 'U' shape around the inner section, the first rod is secured to the shell within the inner section proximal to a distal end of the carriage, the second rod is secured to the shell within the inner section proximal to an opposing distal end of the carriage, the first articulating member is movably attached to the first rod such that the first articulating member pivots around the first rod, the second articulating member is movably attached to the second rod such that the second articulating member pivots around the second rod, and the first articulating member and second articulating member are movably attached to the track such that the first articulating member and second articulating member slide along the track in a vertical manner.

8. The apparatus of claim 7, wherein the mooring line is composed at least partially of Kevlar.

9. The apparatus of claim 7, wherein the mooring line is composed at least partially of Dyneema.

\* \* \* \* \*